US012767434B2

(12) United States Patent
Biller

(10) Patent No.: US 12,767,434 B2
(45) Date of Patent: Oct. 20, 2026

(54) SYSTEM AND METHOD FOR AUTOMATIC WASTE CONTAINER

(71) Applicant: Tristan S Biller, Charlotte, NC (US)

(72) Inventor: Tristan S Biller, Charlotte, NC (US)

( * ) Notice: Subject to any disclaimer, the term of this patent is extended or adjusted under 35 U.S.C. 154(b) by 0 days.

(21) Appl. No.: 18/414,130

(22) Filed: Jan. 16, 2024

(65) Prior Publication Data

US 2025/0229981 A1 Jul. 17, 2025

(51) Int. Cl.
*B65F 1/16* (2006.01)

(52) U.S. Cl.
CPC ...... *B65F 1/1638* (2013.01); *B65F 2210/168* (2013.01)

(58) Field of Classification Search
CPC ......................... B65F 1/1638; B65F 2210/168
USPC ......................................................... 220/211
See application file for complete search history.

(56) References Cited

U.S. PATENT DOCUMENTS 6,974,948 B1 * 12/2005 Brent ....................... G01V 8/20 250/221
2001/0045512 A1 * 11/2001 Brent .................... B65F 1/1638 250/341.7
2003/0205979 A1 * 11/2003 Papari .................. B65F 1/1638 318/466
2017/0096299 A1 * 4/2017 Yang ........................ G01D 5/16
2017/0313509 A1 * 11/2017 Mshamma .............. B65F 1/062
2018/0229931 A1 * 8/2018 Shek ..................... B65F 1/1638
2020/0079587 A1 * 3/2020 Han ...................... B65F 1/1638
2021/0061558 A1 * 3/2021 Shek ..................... B65F 1/1638
2022/0097960 A1 * 3/2022 Yang ....................... G10L 25/51

FOREIGN PATENT DOCUMENTS

CN 114537933 A * 5/2022
CN 116863586 A * 10/2023 ................ B65F 1/14
CN 119037947 A * 11/2024
GB 2580990 A * 8/2020 ................ B65F 1/06
WO WO-2007056703 A2 * 5/2007 ................ B65F 1/06

* cited by examiner

*Primary Examiner* — Orlando E Aviles
*Assistant Examiner* — Niki M Eloshway
(74) *Attorney, Agent, or Firm* — Christopher Mayle

(57) ABSTRACT

A system and method for a waste container with a lid that opens automatically for a user but senses when a pet such as a dog or cat tries to open it by standing up and leaning against the waste container, whereby the automatic waste container has a series of pressure plate sensors on the front of the waste container as well as on the areas surrounding the sensor such that when the pressure plate sensors are engaged the sensor on the waste container turns off so the dog or cat can't open the waste container by putting their paw or face over it.

13 Claims, 3 Drawing Sheets

SYSTEM AND METHOD FOR AUTOMATIC WASTE CONTAINER

FIELD OF DISCLOSURE

This disclosure relates generally to the field of waste containers and more particularly a waste container with an auto lid locking mechanism designed to prevent accidental or unwanted exposure to waste and potentially hazardous material by household pets.

BACKGROUND

Pets, especially dogs and cats, sneaking into the trash can in a kitchen or other room is a common issue faced by pet owners where they stand up against the waste container and wave their paws over the sensor. Trash often contains spoiled food, batteries, bones, or other items such as sharp objects, chemicals, or other hazardous materials that can be harmful to pets. Consuming these can lead to gastrointestinal issues, choking hazards, or toxic reactions in pets. Pets rummaging through trash cans can also create a significant mess in the home, leading to additional cleaning and sanitation issues. This is particularly problematic if the pet spreads trash throughout the house.

Various attempts have been made to prevent animals from getting into waste containers. For example, waste containers sometimes have accelerometers to lock the lid when tipping, manual latches, or foot pedals that must be continuously held. Unfortunately, these are not suitable for automatic opening waste containers where smaller pets would not knock over or tilt the waste container but instead merely lean up against the container. Thus, there exists the need for a new automatic opening waste container.

SUMMARY

The disclosure presented herein relates to an automatic waste container that senses when a pet such as a dog or cat tries to open it by standing up and leaning against the waste container. The automatic waste container has a series of pressure plate sensors on the front of the waste container as well as on the areas surrounding the sensor. When the pressure plate sensors are engaged the sensor on the waste container turns off so the dog or cat can't open the waste container by putting their paw or face over it.

The preceding and following embodiments and descriptions are for illustrative purposes only and are not intended to limit the scope of this disclosure. Other aspects and advantages of this disclosure will become apparent from the following detailed description.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

In the Summary above and in this Detailed Description, and the claims below, and in the accompanying drawings, reference is made to particular features of the invention. It is to be understood that the disclosure of the invention in this specification does not include all possible combinations of such particular features. of other particular aspects and embodiments of the invention, and in the invention generally. It should also be appreciated that any language directed to a number may be replaced by another number such as one or more or a plurality.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

All publications, patents and patent applications referred to herein are incorporated by reference in their entirety to the same extent as if each individual publication, patent or patent application was specifically and individually indicated to be incorporated by reference in its entirety. U.S. Pat. No. 8,569,980, US20230104137, U.S. Pat. No. 8,408,607, US20060196874.

Figure 1:
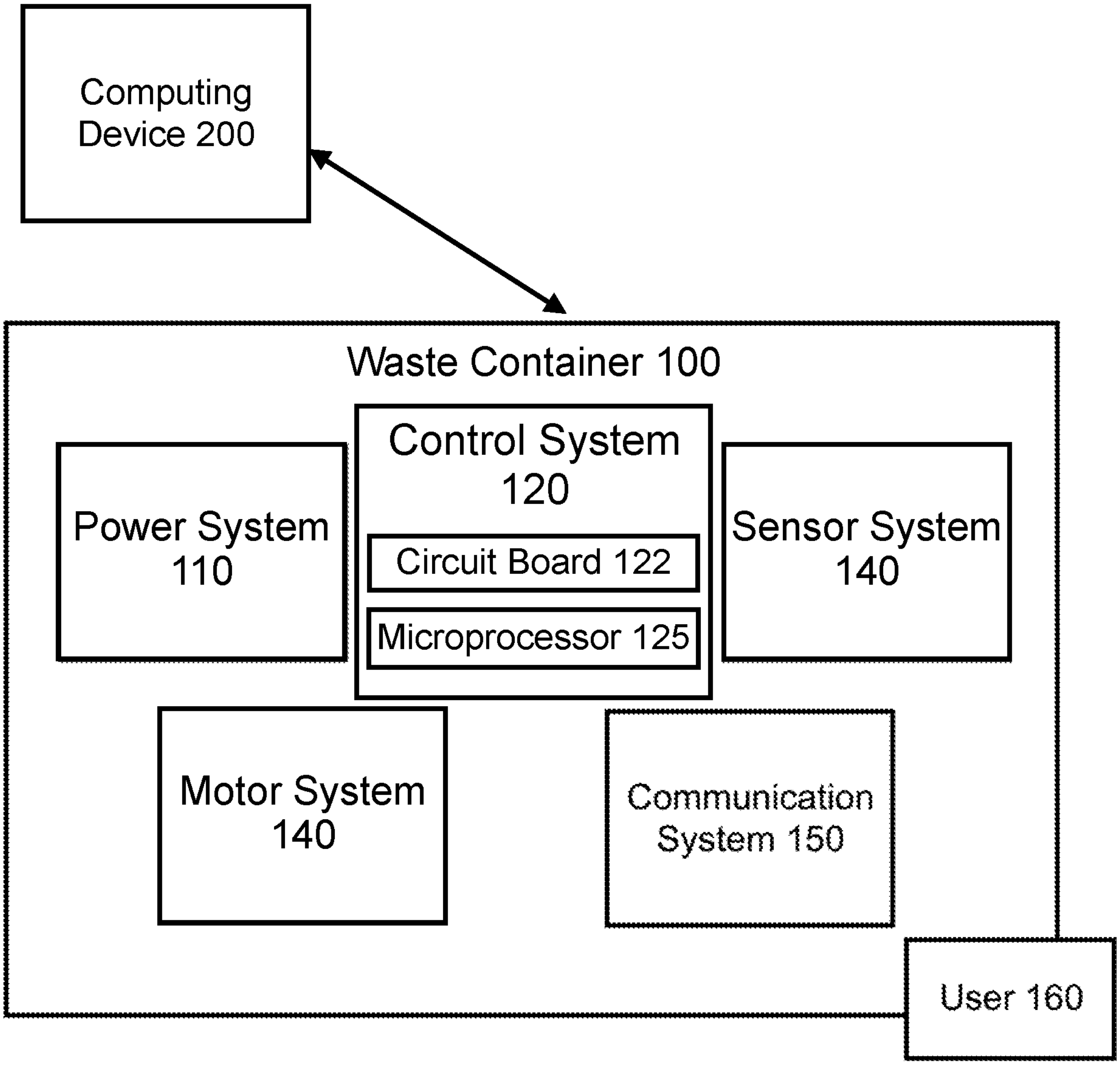
FIG. 1 shows a block diagram of the waste container.

Referring now to FIG. 1, FIG. 1 is a block diagram of a waste container 100. Waste container 100 may be used to store one or more disposable items or trash. Waste container 100 may substantially flush with a floor, and can be of varying heights and widths depending on, among other things, consumer need, cost, and ease of manufacture.

Figure 2:
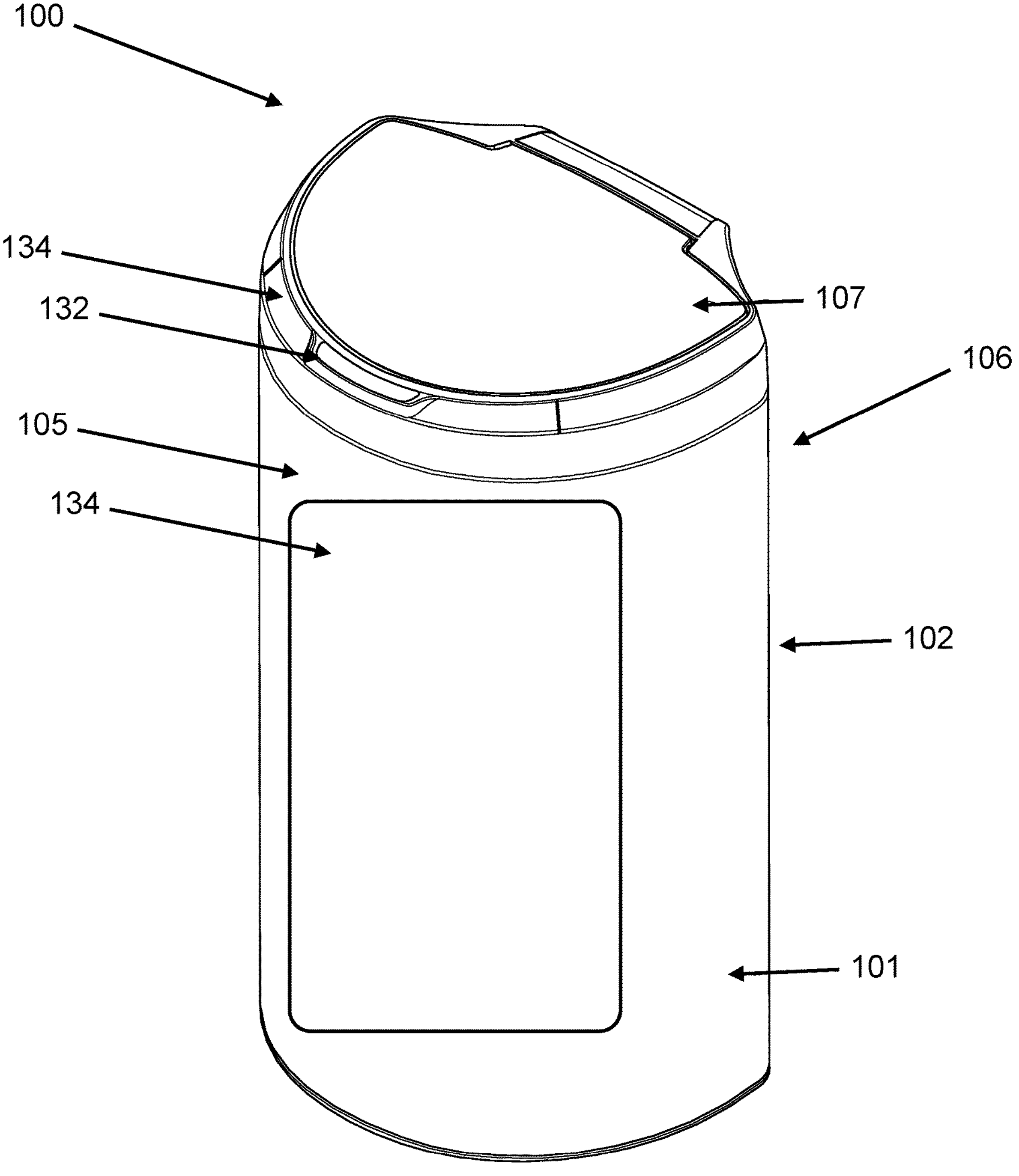
FIG. 2 shows an illustration of the waste container.

Waste container 100 may have a body 101 with an outer shell 102 and an inner shell 103 that is adapted to be retained inside the outer shell 102. Outer shell 102 may be any configuration or shape. As a non-limiting example, FIG. 2 illustrates outer shell 102 as having a generally four-sided configuration with a rear wall 105 and a front wall 106 connected by a series of sidewalls. Inner shell 103 may have the same, or different, shape as the outer shell 102 such that it may be placed inside to and removed allowing the user to attach the garbage bag to inner shell 103 and be retained in outer shell 102. A lid 107 may pivotably connected to the top edge of the rear wall 105 via any conventional hinged connection or may be a separate apparatus positionable inside outer shell 102 whereby lid 107 may rest on top of outer shell 102 and is connected wirelessly or forms a wired connection when placed inside of outer shell 102.

Waste container 100 may include one or more components such as a power system 110, a control system 120, a sensor system 130, motor system 140, a communication system 150.

Power system 110 of waste container 100 provides the power to circuits and components of control system 120, sensor system 130, and communication system 150 during the use. Waste container 100 may be powered by methods known by those of ordinary skill in the art. In some embodiments, waste container 100, may plug into an electrical outlet using an electrical cord to supply power to control system 120, sensor system 130, motor system 140, and communication system 150.

Further power system 110 may include a receptacle for disposable batteries or rechargeable battery pack whereby the rechargeable light is of a charge, design, and capacity, to provide sufficient power to control system 120, sensor system 130, motor system 140, and communication system 150 while running waste container 100 for a set period of time to open and close lid 107.

Control system 120 may operate to control the actuation of the other systems. Control system 120 may have a series of computing devices. Control system 120 may be in the form of a circuit board, a memory or other non-transient storage medium in which computer-readable coded instructions are stored and one or more processors configured to execute the instructions stored in the memory. Control system 120 may have a wireless transmitter, a wireless receiver, and a related computer process executing on the processors.

Computing devices of control system 120, may be any type of computing device that typically operates under the control of one or more operating systems, which control scheduling of tasks and access to system resources. Computing devices may be a Raspberry Pi® or other computing devices such as but not limited to a phone, tablet, desktop computer, laptop computer, gaming system, networked router, networked switch, networked, bridge, or any computing device capable of executing instructions with sufficient processor power and memory capacity to perform operations of control system 120.

The one or more computing devices may be integrated into control system 120, while in other non-limiting embodiments, control system 120 may be a remotely located computing device or server configured to communicate with one or more other control systems. Control system 120 may also include an internet connection, network connection, and/or other wired or wireless means of communication (e.g., LAN, etc.) to interact with other components. The connection allows a user, such as user 160, to update, control, send/retrieve information, monitor or otherwise interact passively or actively with control system 120.

Control system 120 may include control circuitry and one or more microprocessors or controllers acting as a servo control mechanism capable of receiving input from sensor system 130 and communication system 150, analyzing the input from sensor system 130 and communication system 150, and generating an output signal to motor system 140. The microprocessors (not shown) may have on-board memory to control the power that is applied to power system 110, sensor system 130, motor system 140 and communication system 150 in response to input signals from the user 160 and from sensor system 130.

Control system 120 may have a circuit board 122 may include a microcontroller 125 and a set of digital input/output (I/O) pins and analog input pins to connect to sensor system 130, communication system 150, and motor system 140.

Circuit board 122 may be powered through various sources, including USB connections, external power supplies, or batteries, depending on the specific board model. Microcontroller 125 may include a programming interface whereby a user may write code, upload it to microcontroller 125 via a USB connection, and execute the code on microcontroller 125. In further embodiments circuit board 122 may be wireless having an antenna and a radio frequency module enables the circuit board to communicate over radio frequencies for sending and receiving signals wirelessly.

Microcontroller 125 may include a clock crystal or oscillator to provide precise timing for microcontroller 125. Microcontroller 125 may include an onboard reset button allowing the user to restart circuit board 122 and reload new code. Circuit board 122 may include headers and connectors for easy attachment of hardware components, as well as shields which may be stacked on top of circuit board 122.

Control system 120 may include circuitry to provide an actuable interface such as user interface elements 220 for user 160 to interact with, including switches, buttons, and indicators and accompanying circuitry for an electronic control panel or mechanical control panel. Such an actuable interface may present options to user 160 to select from that would allow user 160 to control how various components operate including pictures of what kind of pets they have go adjust the pressure values. Control system 120 may be preprogrammed with any reference values, by any combination of hardwiring, software, firmware to implement various operational modes including but not limited to temperature, light, and humidity values.

The microprocessors in control system 120 may also monitor the current state of circuitry within control system 120 to determine the specific mode of operation chosen by the user. Further, such microprocessors that may be part of control system 120 may receive signals from any of or all systems, including without limitation, sensor system 130, power system 110, and communication system 150. Such systems may be notified whether any of the components in the various systems need to be replaced or the status of the switch and what setting the switch is on.

Figure 3:
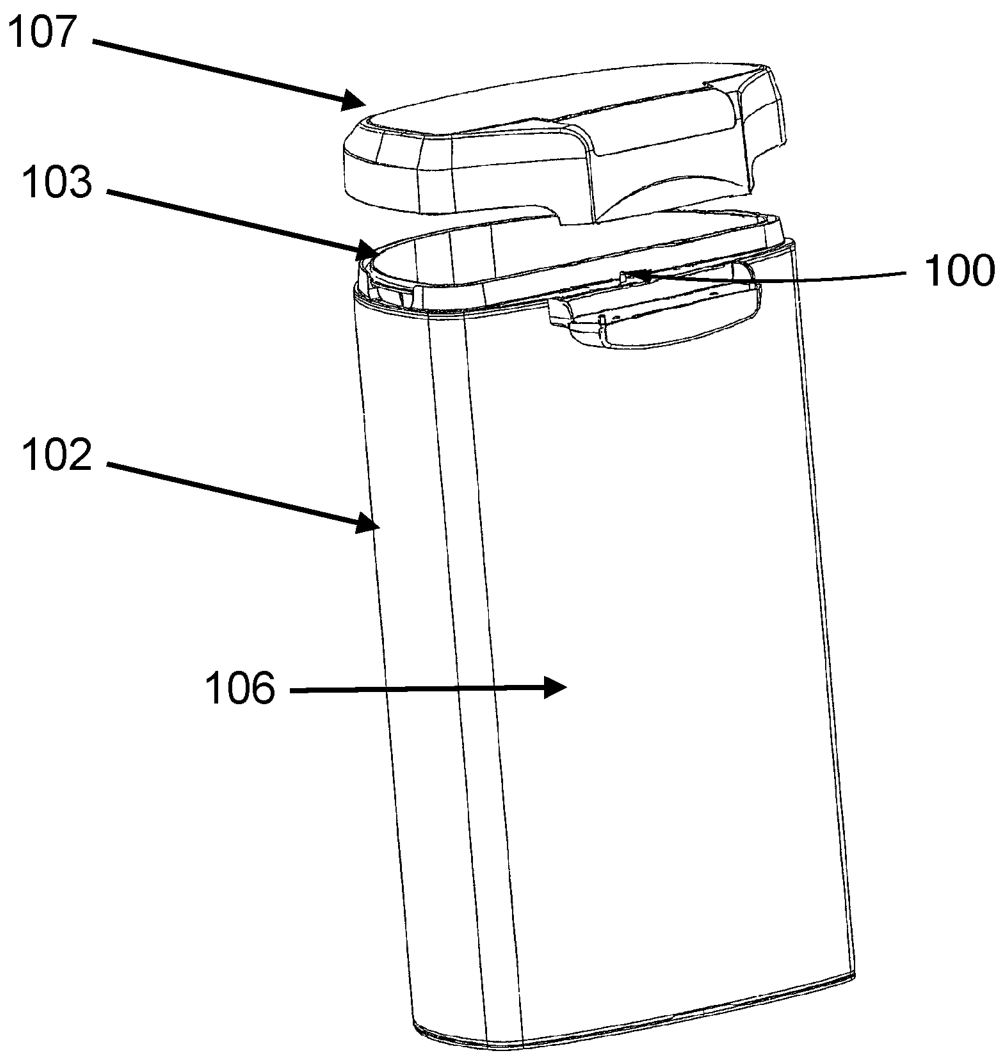
FIG. 3 shows another illustration of the waste container.

Sensor system 130 may include a sensor 132, as shown in FIG. 3, which functions as a proximity sensor to detect the presence of a foot or other object that is approaches, placed above, or within a predetermined distance lid 107 or outer shell 102. Sensor 132 can be embodied in the form of any sensor that is well-known in the art, and can be an infrared sensor. Thus, sensor 132 may be actuated by a user extending a hand (or another object) above sensor 132. Sensor 132 may be coupled to a lid control system that functions to control the opening and closing of the lid 107. The lid control system includes wiring provided inside lid 107 or outer shell 102 to couple the sensor 132 to a circuit board of control system 120, which is in turn coupled via a wiring to a motor and motor gear of motor system 140 that drives a rotary lifting bar to lift lid 107.

Control system 120 control circuit that functions to control the operation of the motor gear, and the opening and closing motions of the lid. The control circuit can be implemented using circuit designs that are well-known to those skilled in the art. The motor gear can be driven in two opposite directions so that the motor gear can also turn the lifting bar in two opposite directions. When the lifting bar rotates in a first direction, the link rods will move upward to push lid 107 open, and when the lifting bar rotates in an opposing second direction, the link rods will move downward to pull the lid closed.

With lid 107 in the closed position, sensor 132 will be actuated when a user places a hand over the path of sensor 132. The actuation of sensor 132 will cause the control circuit in control system 120 to drive the motor gear in the required direction to rotate the lifting bar in the first direction to open lid 107. If the user immediately removes the hand (or other object), then lid 107 may remain opened for a specific period of time (e.g., three to five seconds), and then the control circuit of control system 120 will drive the motor gear in the opposite direction to rotate the lifting bar in the second direction to close lid 107. However, if the user's hand remains over sensor 132 more than a specific period of time (e.g., three to five seconds), then control system 120 will maintain lid 107 in the opened position indefinitely until they eventually remove their hand whereby the lid 107 is closed in a similar manner.

Sensor system 130 may have one or more pressure plate sensors 134 or additional pressure sensors or mechanical switch positioned on waste container 100 or inside of outer shell 102 or inward of outer shell 102. Pressure plate sensors 134 may have mechanism for sensing pressure such as mechanical switches that are activated when enough force is applied to the plate, strain gauges that can measure the exact amount of force applied, or piezoelectric sensors that generate a voltage when pressure is applied, which can then be measured to determine the force. Pressure plate sensors 134 may be placed on front wall 106 and areas around sensor 132 such as on the same top surface. However, this is non-limiting and pressure plate sensors 134 may be placed on any surface where a pet might come into contact with such as by placing their paw or other body part to use as leverage while opening waste container 100. When pressure is applied to pressure plate sensors 134, the plates generate a signal and sensor system 130 sends the signal to control system 120. The generated signal is then used to trigger a response by control system 120 to lock and prevent access to the interior of waste container 100 by preventing control circuit in control system 120 to drive the motor gear in the required direction to rotate the lifting bar in the first direction to open lid 107. This prevention may remain active for a specific predetermined period of time (e.g., five seconds) after each sense of pressure whereby once the period of time is over lid 107 may be opened by sensor 132 once again.

Communication system 150 may allow user 160 to interact with control system 120 using a computing device such as a remote computing device 200 even if user 160 is not proximate to control system 120. User 160 may access a user interface with a plurality of buttons or icons that are selectable by user 160 for communication system 150 to perform particular processes in response to the selections such as turning on a specific mode or setting. In one or more non-limiting embodiments, communication system 150 may be innate, built into, or otherwise integrated into existing platforms or systems such as a website, a third party program, Apple™ operating systems (e.g., iOS), Android™, Snapchat™, Instagram™, Facebook™, or any other platform. With the user interface, user 160 may set times where waste container 100 will always be locked or always be open as well as set for the amount of pressure needed to prevent access to waste container 100. The user interface may have a series of user interface elements where the user may select which type of pet they have in their house and using one or more stored default settings may determine how much pressure those pets can apply and adjust the waste container 100 to prevent the specific range of pressure by that type of pet.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A waste container, the waste container having a body with an opening, the waste container having a lid for covering the opening, the waste container also comprising:

a control system;

a drive system, wherein the control system is connected to the drive system, wherein the drive system is connected to the lid for causing the lid to move from a closed position, wherein the lid covers the opening, to an open position, wherein the waste container is positioned to receive waste, and then back to said closed position;

a proximity sensor, wherein the control system is connected to the proximity sensor wherein when the proximity sensor detects movement of an entity within a predetermined distance of the waste container, the control system sends an opening signal to the drive system to orient the lid in the open position;

one or more pressure plate sensors, wherein the control system is connected to the one or more pressure plate sensors, wherein the one or more pressure plate sensors are separate from the proximity sensor and positioned on an exterior surface of the body of the waste container, wherein the one or more pressure plates sense when sustained pressure resulting from direct physical contact with the body of the waste container is detected on the one or more pressure plate sensors indicating a pet is leaning against and using the waste container as leverage, wherein when the sustained pressure is sensed by the one or more pressure plate sensors, the control system sends a lock signal that overrides the opening signal and prevents the lid from moving from the closed position to the open position even when the movement of the entity is detected by the proximity sensor, wherein the lock signal remains active for a predetermined period of time after each sense of the sustained pressure, whereby upon expiration of the predetermined period of time the lid is again openable via the proximity sensor.

2. The waste container of claim 1, wherein the control system prevents the lid from moving from the closed position to the open position for a predetermined amount of time after the entity was detected by the proximity sensor.

3. The waste container of claim 2, wherein the predetermined amount of time is 5 seconds.

4. The waste container of claim 1, wherein the one or more pressure plate sensors are mechanical switches.

5. The waste container of claim 1, wherein the one or more pressure plate sensors are strain gauges.

6. The waste container of claim 1, wherein the one or more pressure plate sensors are piezoelectric sensors.

7. The waste container of claim 1, further comprising a connected computing device to set predetermined times for preventing the lid from moving from the closed position to the open position.

8. A waste container, the waste container having a lid and a body with an opening, wherein the lid is configured to cover the opening when closed and provide access to an interior of the body when opened, the waste container comprising:

a control system;

a proximity sensor for detecting motion near the waste container and provide access to contents of the waste container when the motion is detected;

one or more pressure plate sensors positioned on a front wall of the body or on areas surrounding the proximity sensor for sensing pressure when a pet places their paw or other body part against the body of the waste container to use as leverage while attempting to trigger the proximity sensor to open the lid, wherein when the pressure is sensed, the control system prevents the lid from moving from a closed position to an open position for a period of time even while the pet waves their limb over the proximity sensor on the waste container, wherein the pressure needed to prevent the lid from moving from the closed position to the open position is customizable on a user interface.

9. The waste container of claim 8, wherein the one or more pressure plate sensors are mechanical switches.

10. The waste container of claim 8, wherein the one or more pressure plate sensors are strain gauges.

11. The waste container of claim 8, wherein the one or more pressure plate sensors are piezoelectric sensors.

12. The waste container of claim 8, wherein the one or more pressure plate sensors are positioned on a front surface of an outer shell of the waste container.

13. A waste container, the waste container having a body with an opening, the waste container having a lid for covering the opening, the waste container also comprising:

a control system;

a drive system, wherein the control system is connected to the drive system, wherein the drive system is connected to the lid for causing the lid to move from a closed position, wherein the lid covers the opening, to an open position, wherein the waste container is positioned to receive waste, and then back to said closed position;

a proximity sensor, wherein the control system is connected to the proximity sensor wherein when the proximity sensor detects movement of an entity within a predetermined distance of the waste container, the control system sends an opening signal to the drive system to orient the lid in the open position;

one or more pressure plate sensors, wherein the control system is connected to the one or more pressure plate sensors, wherein the one or more pressure plate sensors are separate from the proximity sensor and positioned on an exterior surface of the waste container, wherein the one or more pressure plates sense when sustained pressure is detected on the one or more pressure plate sensors indicating a pet is using the waste container as leverage, wherein when the sustained pressure is sensed by the one or more pressure plate sensors, the control system sends a lock signal that prevents the lid from moving from the closed position to the open position even when the movement of the entity is detected by the proximity sensor, wherein the control system provides customizable amounts of pressure needed to send the lock signal.

* * * * *